(12) United States Patent
Pollard et al.

(10) Patent No.: US 9,479,847 B2
(45) Date of Patent: Oct. 25, 2016

(54) WIRELESS HOME ENERGY MONITORING SYSTEM

(75) Inventors: Gary B. Pollard, Knightdale, NC (US); Rodney B. Washington, Raleigh, NC (US)

(73) Assignee: Schneider Electric USA, Inc., Schaumburg (IL)

( * ) Notice: Subject to any disclaimer, the term of this patent is extended or adjusted under 35 U.S.C. 154(b) by 706 days.

(21) Appl. No.: 13/288,671

(22) Filed: Nov. 3, 2011

(65) Prior Publication Data

US 2013/0116953 A1 May 9, 2013

(51) Int. Cl.
| G01R 21/00 | (2006.01) |
| G01R 21/06 | (2006.01) |
| H04Q 9/00 | (2006.01) |
| G01D 4/00 | (2006.01) |
| H04L 12/28 | (2006.01) |

(52) U.S. Cl.
CPC ............... *H04Q 9/00* (2013.01); *G01D 4/002* (2013.01); *H04L 12/2823* (2013.01); *H04L 12/2825* (2013.01); *H04L 2012/2841* (2013.01); *H04Q 2209/40* (2013.01); *H04Q 2209/60* (2013.01); *H04Q 2209/826* (2013.01); *H04Q 2209/883* (2013.01); *Y02B 90/241* (2013.01); *Y02B 90/245* (2013.01); *Y04S 20/32* (2013.01); *Y04S 20/40* (2013.01); *Y04S 20/44* (2013.01)

(58) Field of Classification Search
CPC ............................... G01R 21/00; G01R 21/06
USPC .................. 702/62, 57, 61, 188; 340/870.02, 340/870.05, 870.03, 870.06
See application file for complete search history.

(56) References Cited

U.S. PATENT DOCUMENTS

| 7,464,213 | B2* | 12/2008 | Fukuda ................ G06K 19/077 710/301 |
| 8,238,972 | B2* | 8/2012 | Wang ........................ H04N 5/64 455/550.1 |
| 8,544,047 | B2* | 9/2013 | Tu ....................... H04N 5/44543 725/152 |
| 2004/0006439 | A1* | 1/2004 | Hunter ............................ 702/61 |
| 2006/0103549 | A1* | 5/2006 | Hunt et al. ............... 340/870.02 |
| 2007/0239317 | A1* | 10/2007 | Bogolea et al. ............. 700/276 |
| 2008/0212940 | A1* | 9/2008 | Tan ......................... H04N 5/775 386/231 |
| 2010/0060479 | A1* | 3/2010 | Salter ......................... 340/870.4 |
| 2011/0063126 | A1* | 3/2011 | Kennedy et al. ........ 340/870.02 |
| 2011/0202195 | A1* | 8/2011 | Finch et al. .................. 700/295 |
| 2011/0270452 | A1* | 11/2011 | Lu et al. ....................... 700/291 |
| 2011/0271296 | A1* | 11/2011 | Tu ....................... H04N 5/44543 725/25 |

FOREIGN PATENT DOCUMENTS

| GB | 2451001 A | 1/2009 |
| WO | 2008092268 A1 | 8/2008 |

* cited by examiner

*Primary Examiner* — Sujoy Kundu
*Assistant Examiner* — Ricky Ngon
(74) *Attorney, Agent, or Firm* — Coats & Bennett, PLLC (57) ABSTRACT

A low cost, energy monitoring system comprises a plurality of remote sensors for monitoring energy consumption in specific circuits, or by specific appliances, a adapter that communicates with the remote sensors over a wireless network, and a host device with a display. The remote sensors monitor energy consumption in specific circuits, or by specific appliances, and report the energy consumption by the monitored circuits or appliances to the remote adapter. The adapter stores the energy consumption data in memory and generates output images for display by the host device. The output images are based on display templates stored in the memory of the adapter and define how the energy consumption data is formatted and displayed for the user.

16 Claims, 12 Drawing Sheets

WIRELESS HOME ENERGY MONITORING SYSTEM

BACKGROUND

The present invention relates generally to energy monitoring systems and, more particularly, to a wireless home energy monitoring system to collect and display information to consumers about energy consumption within a home.

Most homes are equipped with utility meters to measure the consumption of utilities, such as power, gas, and water. Utility meters typically measure the total consumption of a utility and the utility meters are read once per month to determine the total consumption of the utility in the household over a one month period. The utility suppliers provide monthly statements to consumers of the utility indicating the total amount of the utility consumed and the cost of the utility.

Growing concerns about the rising cost of energy and global warming have lead to increased demands for more detailed information about energy consumption and for real-time information. Although consumers are provided with information about total consumption of utilities over a given time period, no information is provided about the energy consumption by specific appliances or for specific purposes. Further, consumers are not provided with real-time information showing consumers the energy consumption at any given time of the day or night. Providing real-time information to consumers about energy consumption would encourage consumers to adjust their habits so as to reduce energy consumption and save costs.

Smart energy systems for monitoring and controlling energy consumption in a home are known. The smart energy systems typically comprise a plurality of sensors for monitoring energy consumption in specific circuits or by specific appliances. Data collected by the sensors is communicated over a wireless network to a computer that processes and outputs energy consumption information to a display for viewing by the consumer. Also, the computer may communicate with remote appliance controllers to control the usage of energy within a home.

While smart energy systems are capable of providing consumers with real-time information about energy consumption within a home, such systems are typically very costly to implement, particularly in pre-existing homes. Also, the systems require a specially-programmed computer for processing and displaying the information. Consequently, smart energy systems have yet to obtain widespread acceptance and are typically found only in expensive and/or newly-constructed homes.

Accordingly, there remains a need for a low cost energy monitoring system that can be deployed in existing homes, as well as new homes, at low cost.

SUMMARY

The present invention provides a low cost, energy monitoring system for a home. In one exemplary embodiment, the energy monitoring system comprises a plurality of remote sensors for monitoring energy consumption in specific circuits, or by specific appliances, an adapter that communicates with the remote sensors over a wireless network, and a host device with a display. The remote sensors monitor energy consumption in specific circuits, or by specific appliances, and report the energy consumption by the monitored circuits or appliances to the remote adapter. Additionally, sensors may be provided to detect ambient conditions, such as indoor or outdoor temperatures, and to detect settings for monitored systems, such as the thermostat setting for an HVAC system. The adapter stores the energy consumption data in memory and generates output images for display by the host device. The output images are based on display templates stored in the memory of the adapter and define how the energy consumption data is formatted and displayed for the user.

At periodic intervals, e.g., every ten minutes, a processor in the adapter generates new output images based on the most recent energy consumption data received from the remote sensors. The images created by the processor are stored in memory of the adapter. The adapter includes a standard interface, such as a USB interface, to connect to a host device. In one exemplary embodiment, the host device comprises an electronic picture frame capable of displaying images stored in a removable memory device. The adapter appears as a memory device to the host device. The host device sequentially reads and displays the output images stored in the memory of the adapter. The displayed images may show, for example, the amount of energy consumed by each circuit or appliance in the current day, the current week, the current month, or the current year. The displayed image can also display the cost of the energy consumed. Armed with this information, the user may modify his or her habits to reduce the amount of energy consumed.

The present invention thus provides an inexpensive energy monitoring system that can be used with a low cost display device, such as a digital picture frame. Other advantages of the invention will be apparent from the following description.

DETAILED DESCRIPTION

Figure 1:
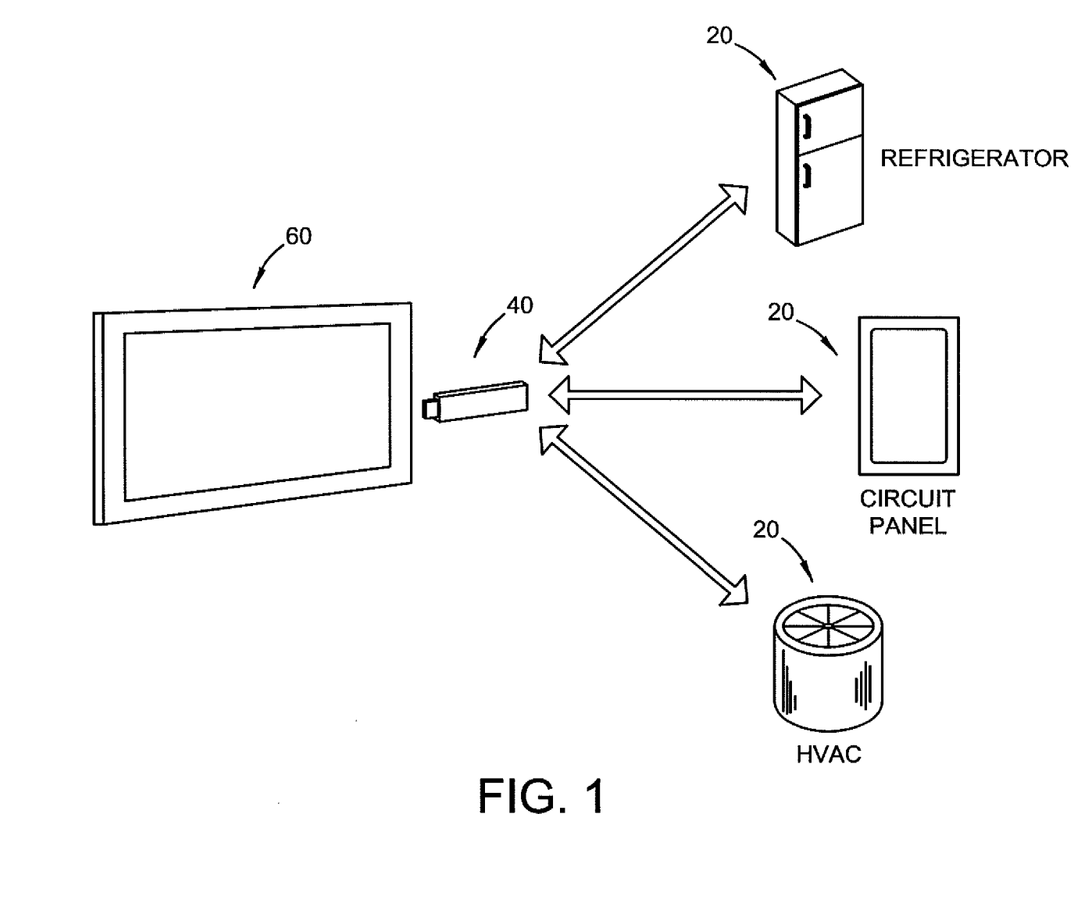
FIG. 1 illustrates an exemplary home energy monitoring system according to one embodiment of the present invention.

Referring now to the drawings, FIG. 1 illustrates an embodiment of the invention for monitoring energy consumption within the home. Although the present invention is described herein in the context of a home energy monitoring system, those skilled in the art will appreciate that the same principles may be applied in other types of monitoring applications.

The home energy monitoring system 10 comprises three main elements: one or more sensing devices 20, an adapter 40 that communicates with the sensing devices 20 over a wireless network, and a host device 60 with a display. The sensing devices 20 monitor the energy consumption within specific circuits or by specific appliances within a home, and transmit the collected data to the adapter 40. The system 10 may further include sensing devices 20 to monitor ambient conditions, or to detect settings for monitored systems. For example, sensing devices 20 may be provided to monitor indoor and outdoor temperatures. Also, sensing devices 20 may be incorporated into a home thermostat to detect the control settings for heating and cooling. The additional information provided by these types of sensing devices 20 will be useful in enabling a consumer to understand how temperature and control settings impact energy consumption and costs. This information will also provide consumers with a better understanding of how to reduce energy consumption.

The adapter 40 stores the energy consumption data in memory, along with other information about ambient conditions and control settings. In some embodiments, the adapter 40 may also store cost information for computing the cost of power or energy consumed. The adapter 40 also stores templates for creating output images to communicate information about energy consumption in the home to the consumer. The templates include provide instructions for creating the output images. For example, the templates specify what data to select for the output image, how the data is grouped, what calculations to perform to create the displayed data, how to format the displayed data, and the layout of the output images. The output images are continuously updated with the most recent energy consumption data received from the sensing devices 20, and the updated images are stored in memory of the adapter 40. As will be hereinafter described in greater detail, the adapter 40 includes a standard interface, such as a USB interface, to connect with a host device 60. The host device 60 accesses the output images stored in memory of the adapter 40 and displays the output images to the consumer. For example, the host device 60 may cycle through each of the output images, displaying each output image for a predetermined period of time, e.g., ten seconds.

The sensing devices 20 and adapter 40 implement a wireless networking protocol to form a personal area network (PAN) or home area network (HAN). There are numerous wireless networking protocols available which are suitable for use in connection with the present invention. Examples of wireless networking protocols include ZIG-BEE, BLUETOOTH, and Wi-Fi wireless networking protocols. Other wireless networking protocols now known or later developed may also be used.

For illustrative purposes, the exemplary embodiment of the invention described herein uses the ZIGBEE wireless networking protocol. The ZIGBEE standard is built upon the Institute of Electrical and Electronics Engineers (IEEE), 802.15.4 standard that defines a short-range, low power, low data rate wireless interface for small devices with limited power, CPU, and memory resources. The ZIGBEE standard comprises a set of network and application level protocols for communication between ZIGBEE nodes.

There are three types of ZIGBEE nodes: coordinator, router, and end device. The coordinator is responsible for setting up and managing the ZIGBEE network to which the other nodes may join. A ZIGBEE network that uses a tree or mesh topology requires the presence of at least one router. The router relays messages from one node in the ZIGBEE network to another and allows child nodes to connect to it. A router acts as a local coordinator for the end devices joining the ZIGBEE network. End devices typically host one or more applications to perform a specified task. For example, end devices may have applications to collect and report data, and to remotely control a connected device. In the exemplary embodiment, the adapter 40 operates as a coordinator, and the sensing devices 20 act as routers or end devices.

A ZIGBEE node may host one or more user applications. An application hosted on a ZIGBEE node may send messages to, and receive messages from, other applications within the ZIGBEE network. Applications are modeled as application objects. An application profile defines the interactions between related or complementary application objects. An application profile may be public or private. A public application profile enables devices from different vendors to inter-operate. Private application profiles are proprietary. The ZIGBEE alliance provides a number of public profiles. One such public profile is the smart energy profile which focuses on monitoring and control of home energy consumption. In the context of the present invention, ZIGBEE applications in the sensing devices 20 collect energy consumption data and send the energy consumption data to the adapter 40. The adapter 40 receives the energy consumption data from the sensing devices and generates output images as hereinafter described.

Figure 2:
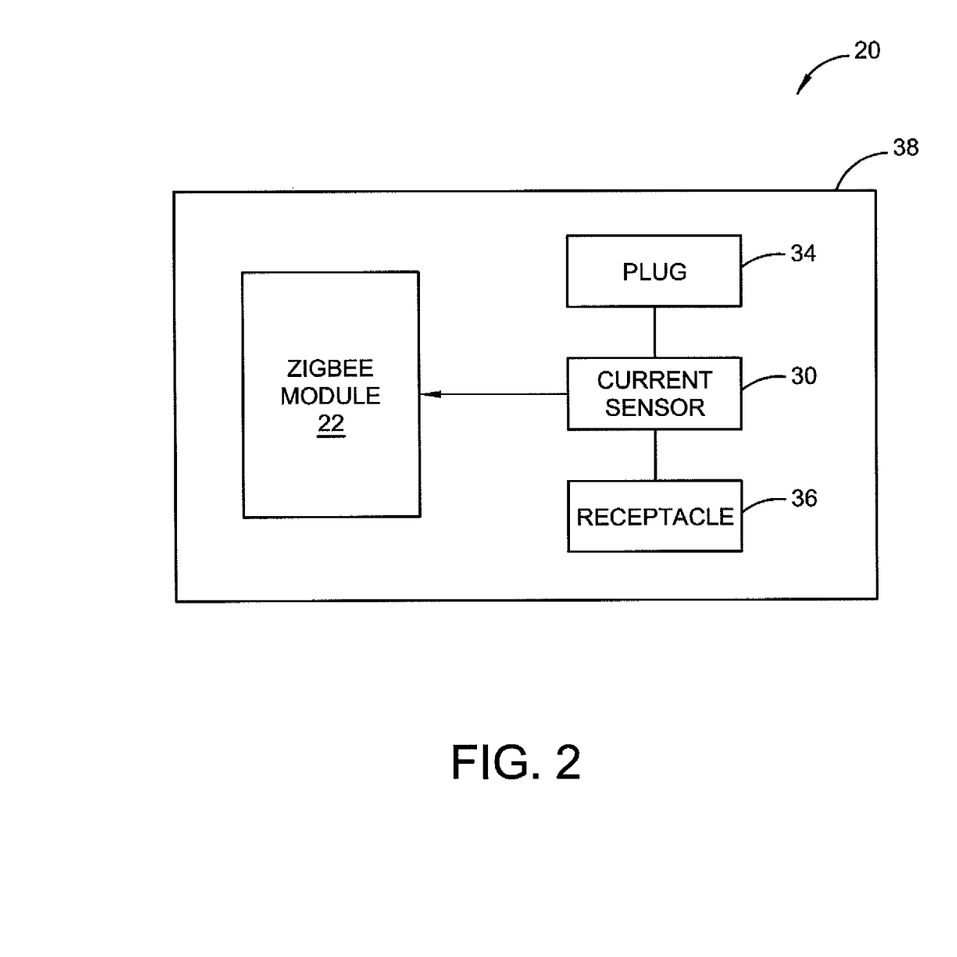
FIG. 2 illustrates an exemplary sensing device for the home energy monitoring system for monitoring a single appliance.

FIG. 2 shows an embodiment of a sensing device 20 for monitoring current by a single appliance, such as a refrigerator or television. For convenience, similar reference numbers are used in FIGS. 2 and 3 to indicate similar components. The sensing device 20 shown in FIG. 3 comprises a wireless module 22 and a single sensor 30. The sensor 30 is interposed between a wall plug 34 and receptacle 36. The plug 34 may be a conventional two or three-prong plug configured to plug into a wall receptacle in the home. Similarly, receptacle 36 is a conventional two or three-prong receptacle. The plug 34 and receptacle 36 are disposed on a housing 38 enclosing the components of the sensing device 20.

In use, the sensing device 20 is plugged into a wall outlet where an appliance is to be connected. The appliance may then be plugged into the receptacle 36 on the sensing device 20. The sensor 30 can thus monitor the current and/or voltage utilized by the connected appliance. The wireless module 22 within the sensing device 20 collects data from the sensors 30 and periodically reports the collected data to the adapter 40. In some embodiments, the wireless module 22 in the sensing devices 20 may report the current and/or voltage measurements received from the sensors 30. Also, the wireless module 22 could compute the instantaneous power and/or energy from the current and voltage measurements. The wireless module 22 may report instantaneous power and/or energy to the adapter 40 in addition to, or in place of, the current and/or voltage measurements.

Figure 3:
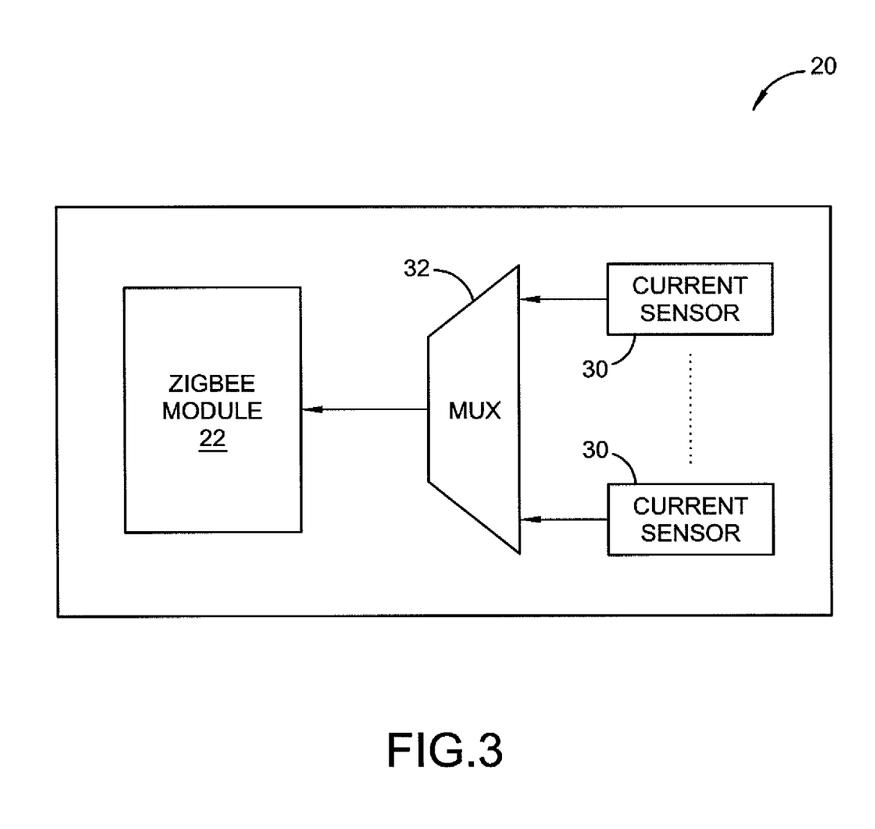
FIG. 3 illustrates an exemplary sensing device for the home energy monitoring system for monitoring multiple circuits.

FIG. 3 illustrates another exemplary sensing device 20 for monitoring current in multiple home circuits. Sensing device 20 shown in FIG. 3 may be disposed within a load panel or circuit panel to monitor energy consumption in a plurality of circuits within the home. The sensing device 20 comprises a wireless module 22 and a plurality of sensors 30. Each sensor 30 monitors the energy consumption in a specific home circuit. The sensors 30 may comprise, for example, split-core current transformers that clamp around wires in the circuit branches. The sensors 30 sample and measure the current in individual circuits. The sampling interval may vary from every few seconds to several minutes. The outputs of the sensors 30 are applied via a multiplexer 32 to an input of the wireless module 22. At periodic intervals, the wireless module 22 obtains current and/or voltage measurements from the sensor 30 and transmits the measurements to adapter 40. As previously noted, the wireless module 22 could also compute the instantaneous power and/or energy from the current and voltage measurements and report instantaneous power and/or energy to the adapter 40.

Figure 4:
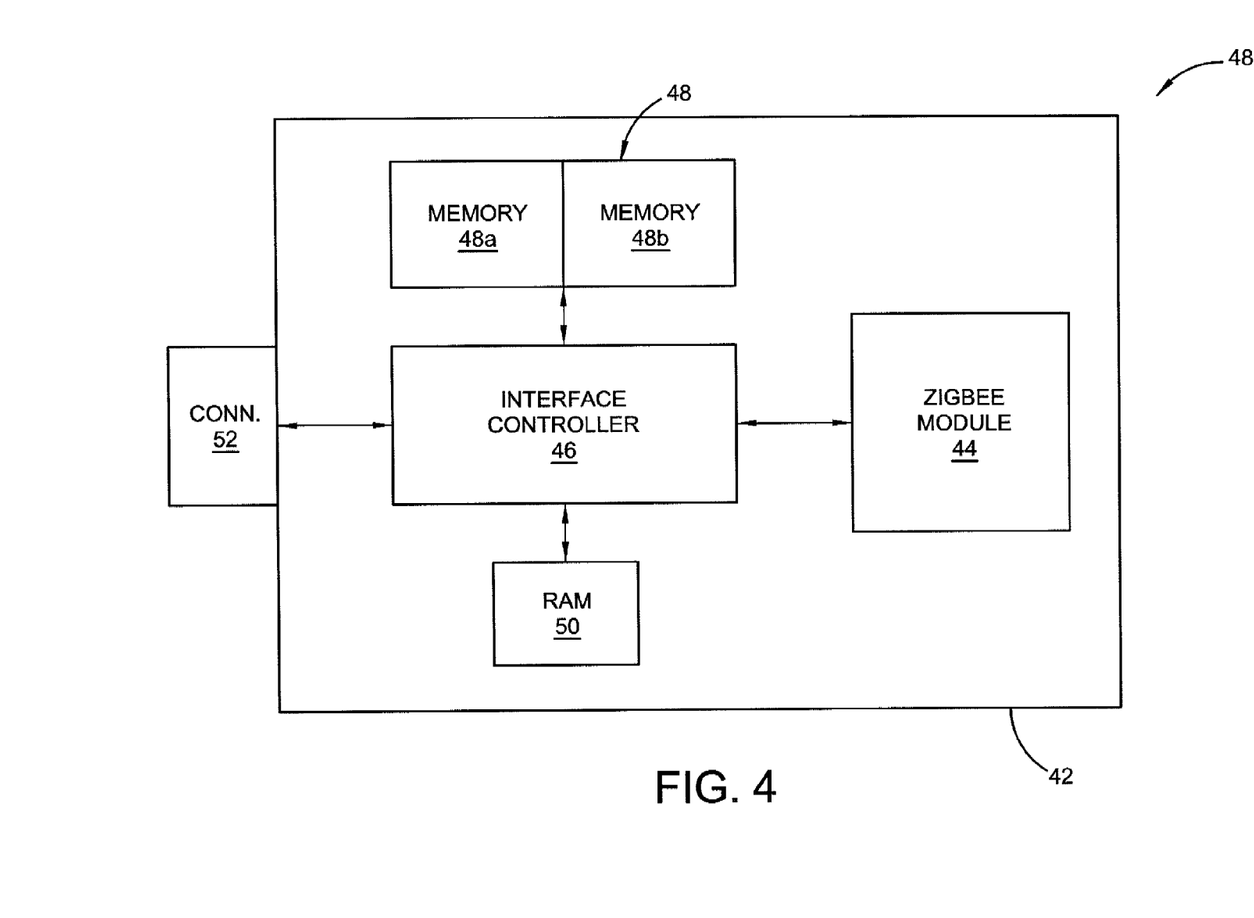
FIG. 4 illustrates an exemplary adapter for the home energy monitoring system.

FIG. 4 illustrates an exemplary adapter 40 according to one embodiment of the invention. The main functional components are contained within a single, unitary housing 42. These components comprise a wireless module 44, interface controller 46, non-volatile memory 48, and random access memory 50. The wireless module 44 in the adapter 40 functions as a coordinator for the home area network (e.g. ZIGBEE network), receives measurement reports from the sensing devices 20, stores the data in memory 48, and creates output images for display by the host device 60. In some embodiments, the measurement reports may include current and/or voltage measurements from the sensing devices 20 and the wireless module 44 may be configured to compute instantaneous power and/or energy from the current and voltage measurements. In other embodiments, the measurement reports may include instantaneous power and/or energy measurements. The instantaneous power or energy can be multiplied by time to compute the power or energy consumed. Memory 48 may also store cost information for computing the cost of the power or energy consumed. For example, the cost per unit of power (e.g. dollars per KWH) may be stored in memory 48, which can be multiplied by the units of power or energy consumed to obtain the total costs.

The interface controller 46 provides support for one or more standard computer interfaces and manages data transfer between the adapter 40 and host device 60, or between the adapter 40 and a computer system during configuration. The interface controller 46 is electrically connected with a physical connector 52 that provides a means for removably connecting the adapter 40 to a host device 60. In one exemplary embodiment, the interface controller 46 comprises a PIC18F87J50 chip manufactured by Microchip Technology Inc. The PIC18F87J50 chip comprises an 8-bit microcontroller with a built-in USB 2.0 module. The connector 52 comprises a male USB connector for insertion into a complementary female USB connector on the host device 60.

Memory 48 provides non-volatile memory for storing data received from the sensing devices 20 and for storing output images created for display on the host device 60. Any form of non-volatile memory could be used, such as electrically-erasable programmable read-only memory (EEPROM) or Flash memory. Also, the hard disk or removable media, such as a DVD, could be used as non-volatile memory. The random access memory 50, such as synchronous dynamic random access memory (SDRAM), provides a volatile memory for temporary storage of program instructions and data. Memory 48 may be partitioned into a shared memory 48a and a non-shared memory 48b. The shared memory 48a is accessible to the host devices 60 and stores the output images. The non-shared memory 48b is hidden from the host device 60 and is used to store the energy monitoring application and energy consumption data collected by the adapter 40. In other embodiments, the energy consumption data could be stored in the shared memory.

Figure 5:
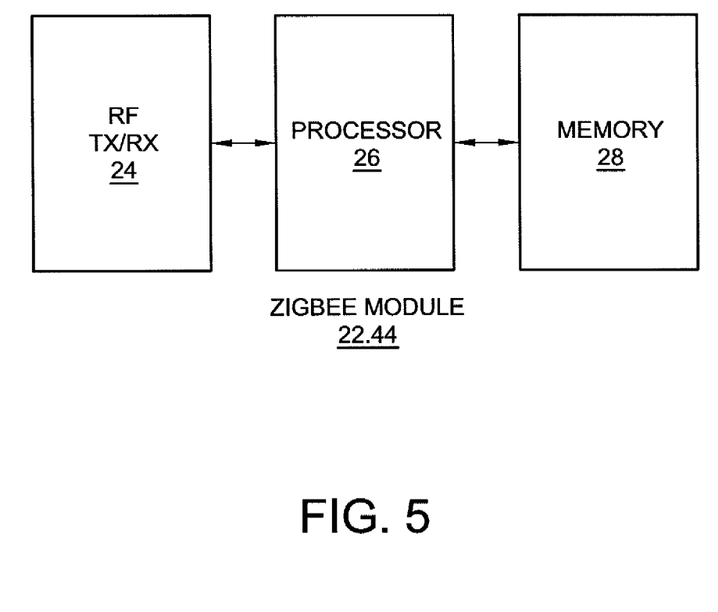
FIG. 5 illustrates an exemplary wireless module for a sensing device or adapter.

FIG. 5 illustrates an exemplary wireless module 22, 44 which may be used in the sensing device 20 of FIG. 2 or FIG. 3, or in the adapter 40. The wireless module 22, 44 contains an RF transceiver 24, a processor 26, and memory 28 on a single chip. As one example, the wireless module 22 may comprise the MC13224V chip manufactured by Free Scale Semiconductor Inc. The MC13224V chip comprises a 2.4 GHz RF transceiver, 8-bit microcontroller that implements ZIGBEE protocols, and 60 k of flash memory for ZIGBEE applications. An energy monitoring application is stored in memory 28 and is executed by the processor 26.

A file-based communication scheme is used for communication between the processor 26 in the wireless module 44 and the host device 60. The interface controller 46 effectively conceals the presence of the wireless module 48 while allowing access by the host device 60 to the shared memory 48a so that the adapter 40 appears to the host device 60 as a mass storage device. The energy monitoring application executed by the processor 26 communicates with the host device 60 by generating output images and storing the output images in the shared memory for subsequent retrieval by the host device 60. It is not necessary that the host device 60 be aware of the processor 26 within the adapter 40.

The host device 60 may, for example, comprise a conventional digital picture frame that sequentially displays digital images stored in an internal memory or an external memory device, such as a USB memory device. In one exemplary embodiment, the adapter 40 is configured to plug into a standard USB 2.0 serial port in the digital picture frame. The adapter 40 appears to the digital picture frame or other host device as a USB memory device. Thus, the digital picture frame will sequentially display output images in recognized formats that are stored in the memory 48 of the adapter 40.

In some embodiments, the host device 60 may comprise a conventional home computer and the adapter 40 plugs into a USB port on the computer. An application on the home computer can access and sequentially display the output images stored in memory 48 of the adapter 40 as previously described. In some embodiments, a hypertext mark-up language (HTML) file containing links to the output images can be stored in memory 48 of the adapter 40. A browser running on the home computer can access the HTML file with links to the output images, and sequentially display the output images within a browser window. One advantage of this approach is that no special software is required to view the output images.

In use, one or more sensing devices 20 are installed within the home to monitor energy consumption by specific circuits or appliances. As previously noted, the sensing device 20 as shown in FIG. 2 may be installed in a circuit panel and monitor multiple circuits within the home. Alternatively, or in addition, one or more sensing devices 20 as shown in FIG. 3 may be used to monitor energy consumption by specific appliances. Once the sensing devices 20 are installed, the adapter 40 is configured to associate the home circuits and appliances being monitored with meaningful labels or symbols that can be understood by the user. During configuration, circuit groups can be created for multiple circuits. For example, a group called "HVAC" may be created for all HVAC equipment within the home. As another example, multiple refrigerators and freezers could be grouped together into a circuit group called "Refrigeration." When a circuit group is created, the output images will report energy consumption for the circuit group rather than the individual circuits within the circuit group.

A configuration application, which is referred to herein as a configuration tool, can be stored in memory 48 of the adapter 40 to simplify configuration of the adapter 40 by a user. A home computer may be used for the configuration. When the adapter 40 is plugged into the home computer, the home computer can access the configuration tool stored in the adapter 40. The configuration tool can display a list of circuits that are being monitored. The user can use the configuration tool to group circuits together, and to apply meaningful labels to individual circuits and/or circuit groups.

The configuration tool may also provide the user with a list of templates that are available for generating output images. The user may select the desired templates for generating the display images. In some embodiments, the templates may be customizable by the user. For example, user preferences may be used to select color schemes, content, and layout for the templates.

Once the configuration of the adapter 40 is complete, the adapter 40 may be plugged into a digital picture frame or other host device 60. The adapter 40 will automatically establish connections with the sensing devices 20 and begin generating output images when data is available.

Figure 6:
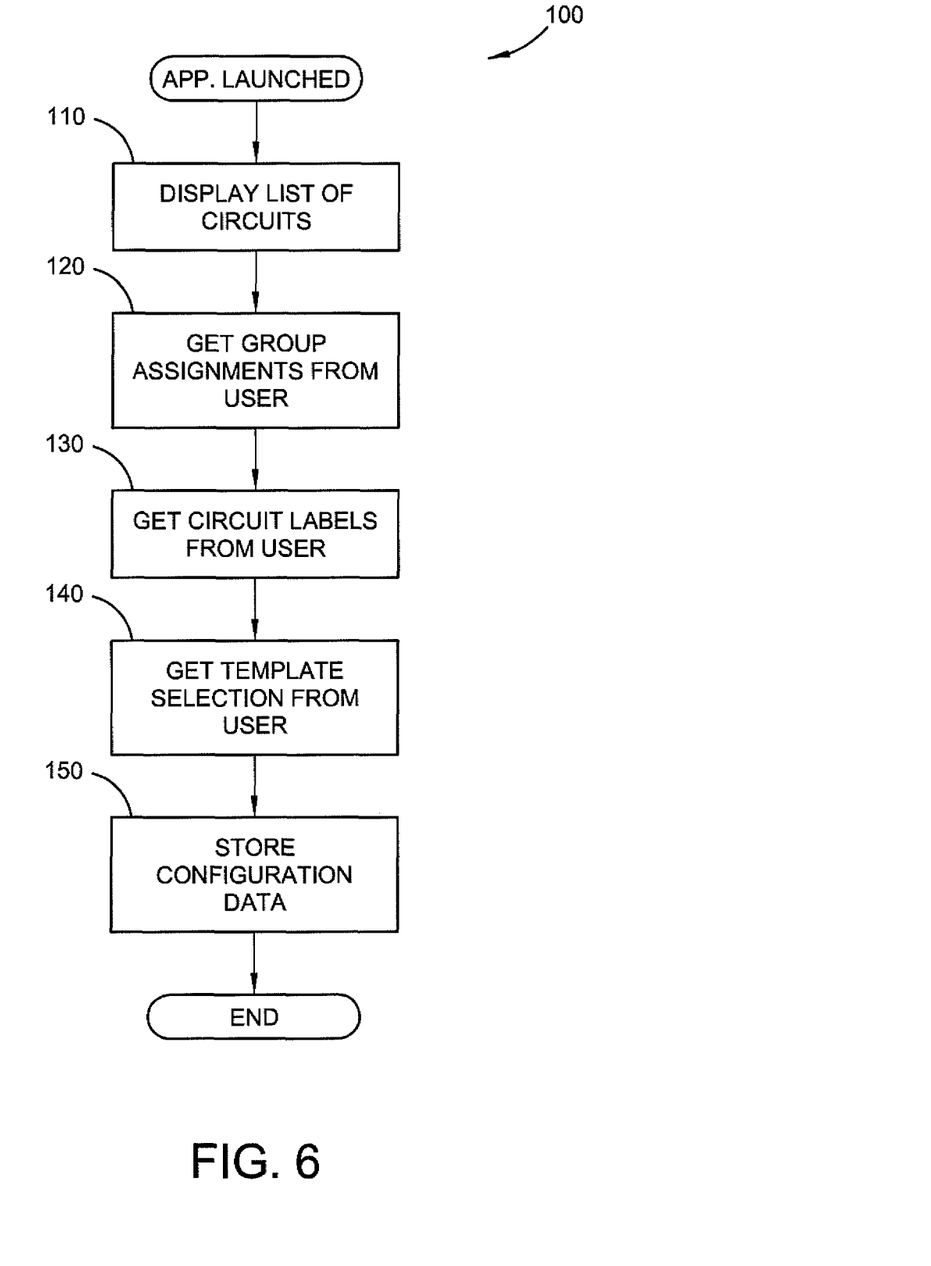
FIG. 6 illustrates an exemplary method for configuring the adapter for the home energy monitoring system.

FIG. 6 illustrates an exemplary method 100 according to one embodiment for configuring the adapter 40. The procedure begins when the configuration tool stored in the adapter 40 is launched. The configuration tool displays a list of circuits being monitored (block 110). The user may optionally assign circuits to circuit groups (block 120). The user then selects labels for the individual circuits and circuit groups (block 130). In one exemplary embodiment, a drop-down list of typical labels may be provided from which the user may select labels for different circuits. The configuration tool may also support custom labels. In one exemplary embodiment, groups can be created by applying the same label to different circuits. In this case, the configuration tool will assign all circuits with the same label to a single circuit group. In other embodiments, the circuit groups may be established independently of the labels. Once the circuit groups are created and labels selected, the user selects the display templates for generating the output images (block 140). The display templates may be customizable by the user. In this case, the user may optionally modify the display templates. The information input by the user is stored as configuration data in memory of the adapter 40 (block 150).

Figure 7:
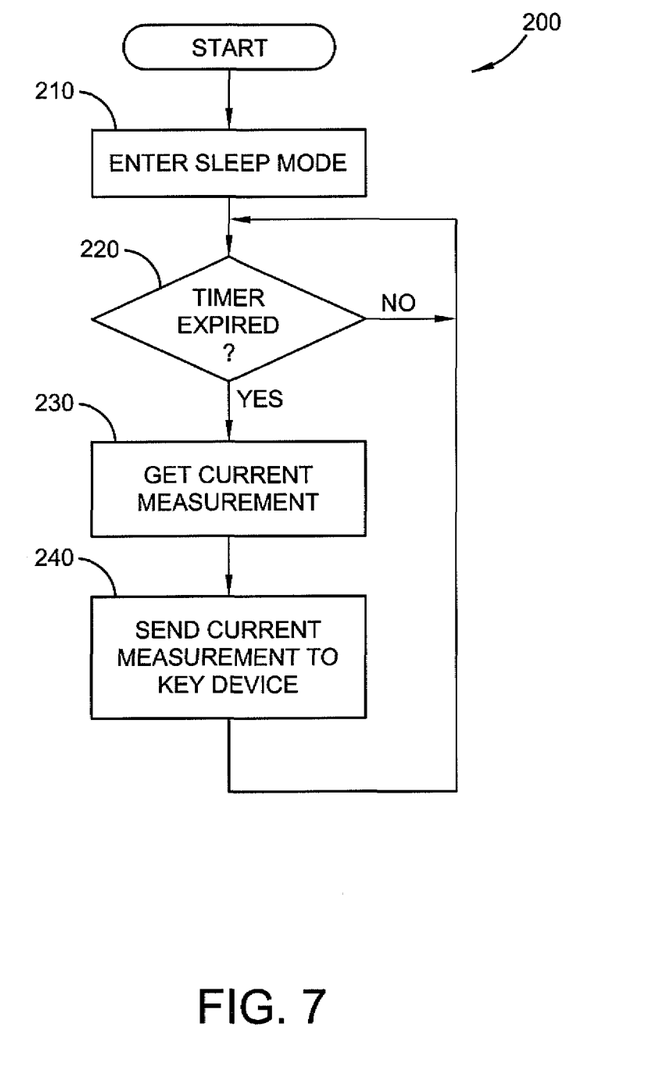
FIG. 7 illustrates an exemplary method implemented by a sensing device in the home energy monitoring system.

FIG. 7 illustrates an exemplary method 200 implemented by an energy monitoring application hosted in a sensing device 20. The procedure begins when the sensing device 20 (FIG. 1) is activated and joins the ZIGBEE home network or other home area network (HAN). The sensing device 20 enters a sleep mode (block 210) and wakes periodically upon expiration of a sleep timer (block 220). When the sensing device 20 wakes, it measures the current and/or voltage in the circuit or circuits being monitored (block 230) and sends the measurements to the adapter (block 240). The sensing device 20 could also compute the instantaneous power and/or energy from the current and voltage measurements and report instantaneous power and/or energy to the adapter 40 (FIG. 1). In some embodiments, the measurements may be stored temporarily in memory of the sensing device 20 prior to transmission to the adapter 40 (FIG. 1).

Figure 8:
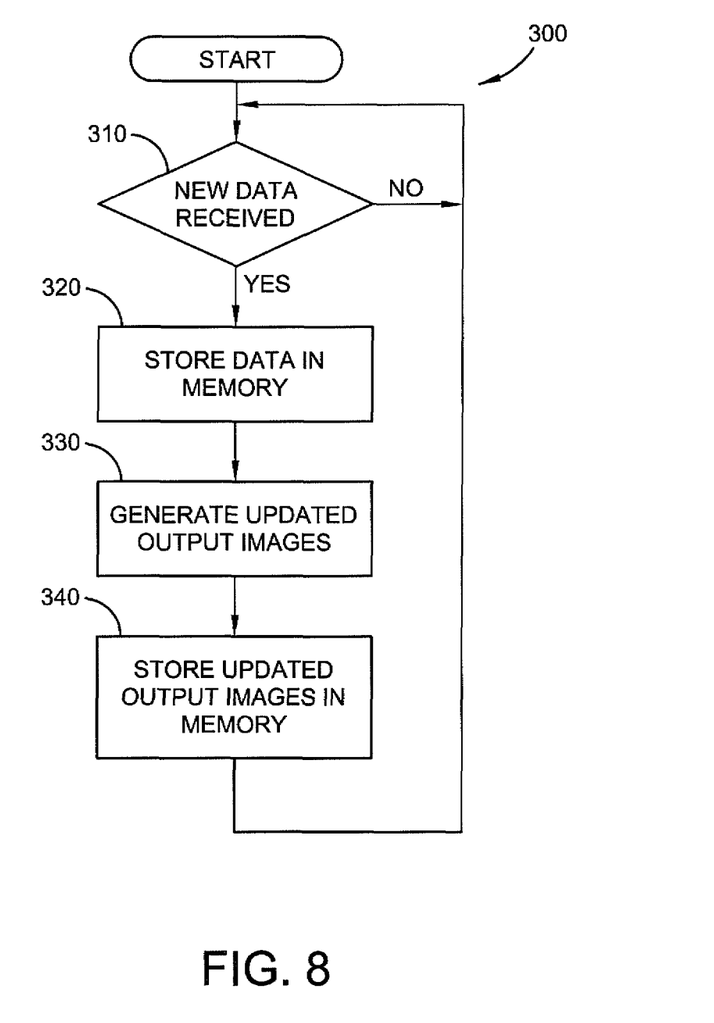
FIG. 8 illustrates an exemplary method implemented by an adapter in the home energy monitoring system.

FIG. 8 illustrates an exemplary procedure 300 implemented by the adapter 40. The adapter 40 receives energy consumption data from the sensing devices 20 at periodic intervals as previously described (block 310) and stores the received data in memory (block 320). As previously describe, the energy consumption data may comprise current and/or voltage measurements, instantaneous power, and/or energy. In some embodiments, the adapter may receive current and/or voltage measurements and compute instantaneous power and energy. When new data is received, the adapter 30 updates the output images to reflect the new data (block 330). As previously described, the output images are generated based on display templates and energy consumption data stored in memory of the adapter 40. Once the output images are generated, the adapter 40 stores the output images in memory (block 340). In one exemplary embodiment, the updated output image overrides the previous output image so that the memory is not consumed by the stored images. The output images are then available for display by the host device 60.

Figure 9:
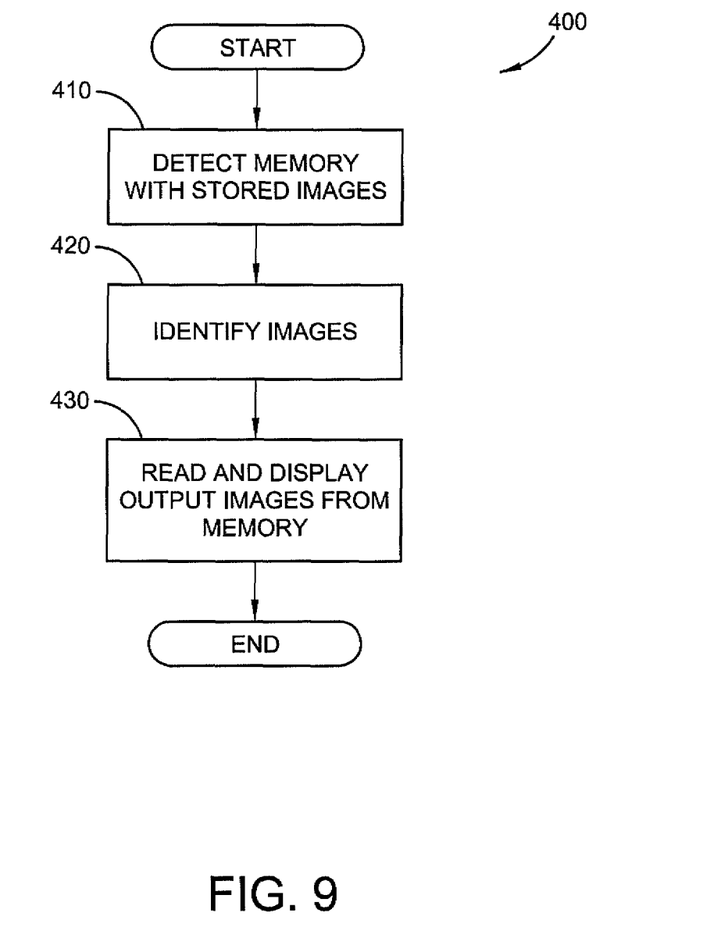
FIG. 9 illustrates an exemplary method implemented by a host device in the home energy monitoring system.

FIG. 9 illustrates an exemplary procedure 400 implemented by a host device 60, such as a digital picture frame. The procedure begins when the adapter 40 is plugged into the host device 60. The host device 60 initially detects the presence of the adapter 40 when the adapter is plugged into the USB port of the host device (block 410). The host device 60 accesses the memory of the adapter 40 and identifies images that are in the proper format for display on the host device 60 (block 420). The host device 60 then sequentially reads and displays each of the output images (block 430). In one exemplary embodiment, the host device 60 cycles through each of the output images and displays each output image for a predetermined time period. The process repeats when all the output images have been displayed.

Figure 10:
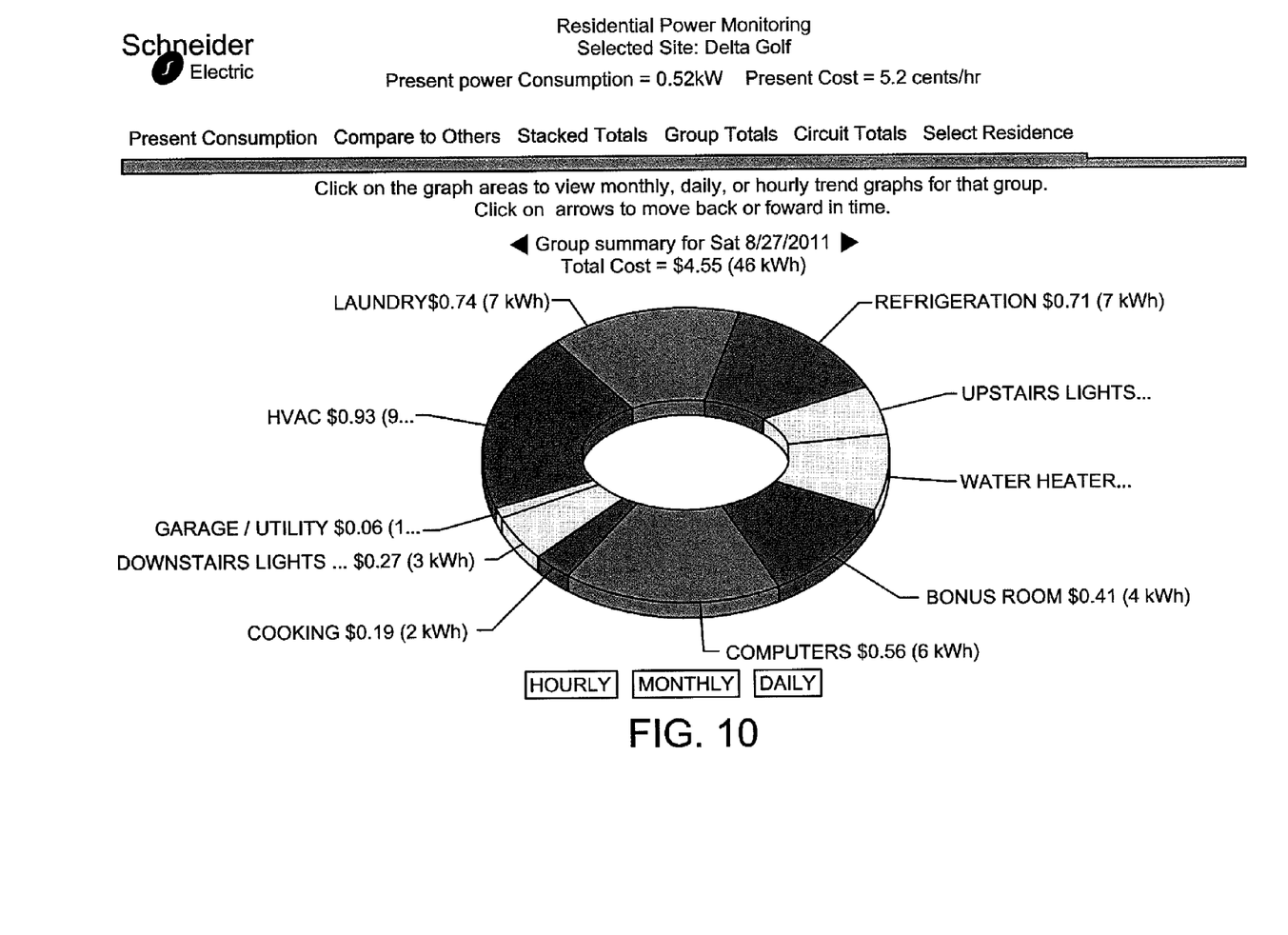
FIG. 10 is an exemplary output image showing the energy consumed in a day by various circuit groups.
Figure 11:
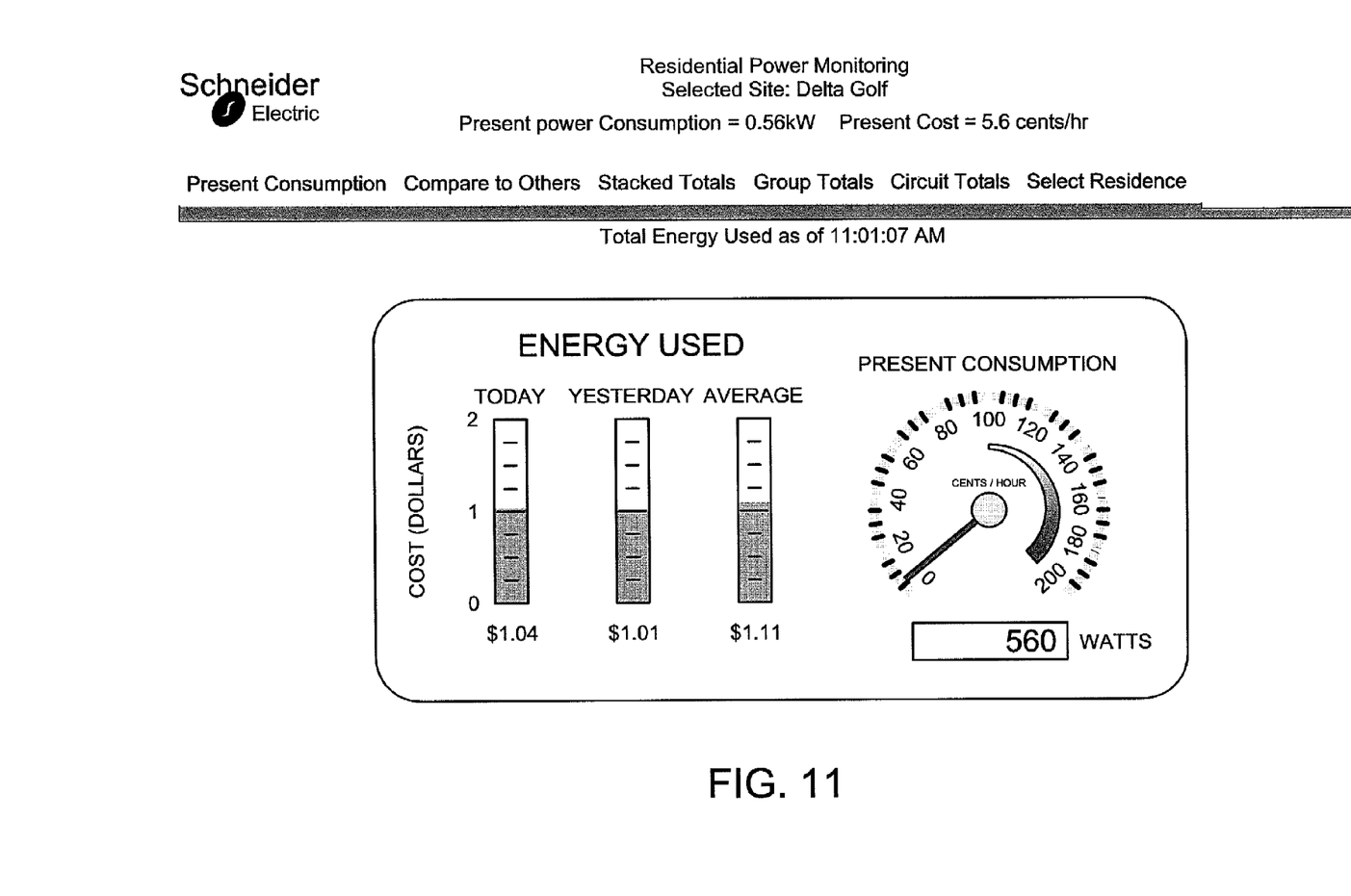
FIG. 11 is an exemplary output image showing the cost of energy consumed in a day.
Figure 12:
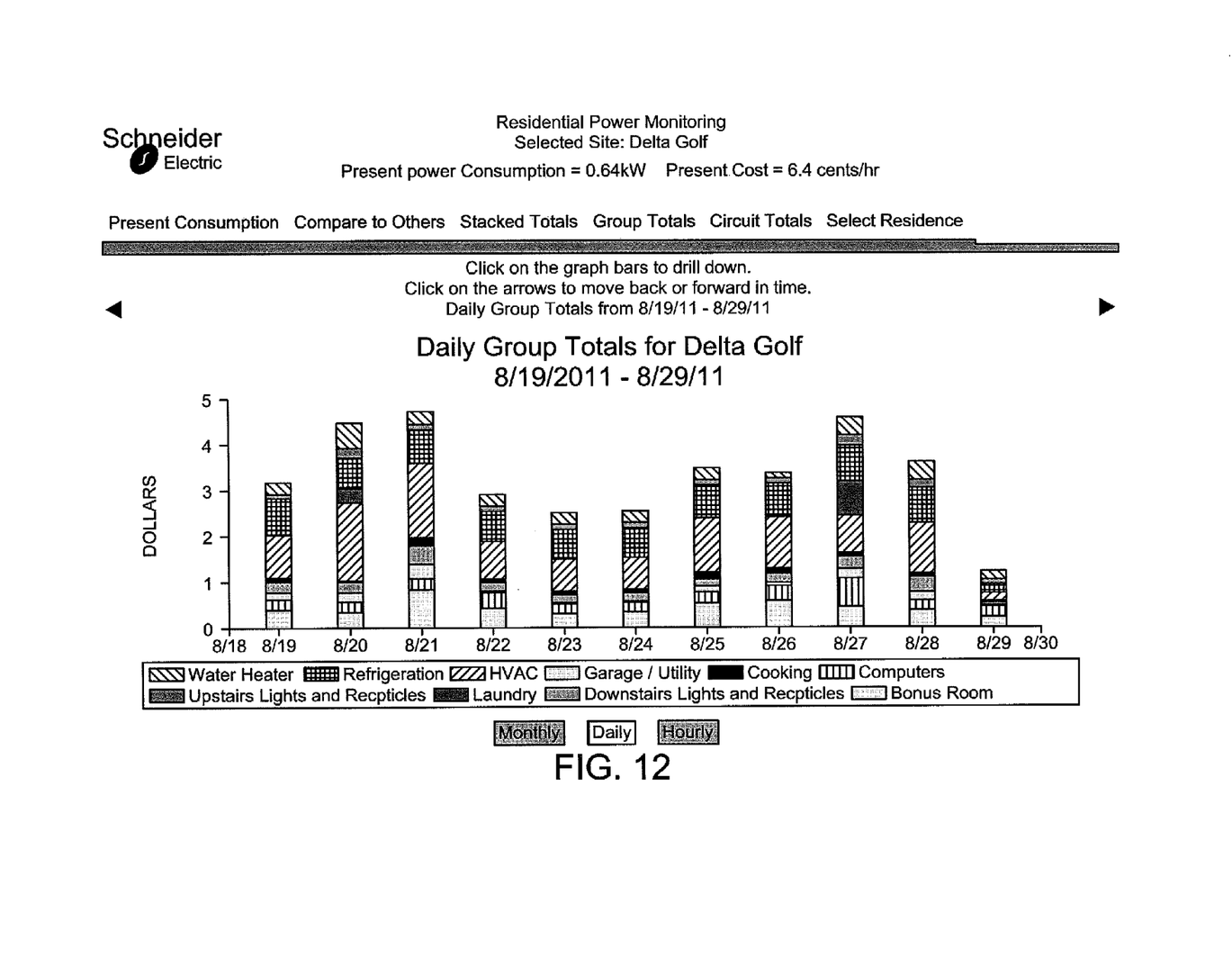
FIG. 12 is an exemplary output image showing the energy consumed over multiple days by various circuit groups.

FIGS. 10-12 illustrate some of the output images that can be generated and displayed. FIG. 10 shows a daily group summary for the defined circuit groups within a home. The group summary indicates the amount of energy consumed by each group and the cost of the energy consumed by each group. FIG. 11 shows the total costs of energy consumed in a day and compares the total energy consumed to the previous day and to an average daily consumption. The output image also includes a meter to indicate the rate of the energy consumption in cents per hour. FIG. 12 shows daily group totals for the defined circuit groups for a period of 12 days. These output images are intended to illustrate the types of output images that can be generated and should not be construed as limiting the invention. Many other types of output images are possible.

The energy monitoring system according to the present invention provides a low cost home energy monitoring system for displaying real time data to a user. The form factor of the adapter 40 may be similar to a USB memory device that removably connects with a low cost host device. The image generation processing is performed by the adapter. The information displayed to the user can be customized to suit the user's needs using simple templates. Providing real-time data regarding energy consumption to consumers encourages consumers to conserve energy in order to lower their energy costs.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A monitoring system comprising:
 one or more wireless sensing devices for collecting energy consumption data,
 a host device including a display;
 an adapter to removably connect to said host device, said adapter comprising:
   a housing;
   a wireless transceiver disposed within the housing to receive energy consumption data from the sensing devices;
   memory within the housing to store the energy consumption data and one or more display templates, said memory comprising shared memory accessible by said host device;

a processor within the housing and configured to:
   create one or more output images based on the energy consumption data and the display templates; and
   share the output images with the host device using a file-based communication scheme by storing the output images in the shared memory for retrieval by the host device; and
an interface including a physical connector to removably connect the adapter to the host device and an interface circuit to provide the host device with access to the output images stored in the shared memory.

2. The monitoring system of claim 1 wherein the memory further comprises hidden memory for storing the energy consumption data, said hidden memory being inaccessible to said host device.

3. The home energy monitoring system of claim 2 wherein one of the sensing devices comprises a plurality of sensors for monitoring energy consumption in a plurality of circuits.

4. The home energy monitoring system of claim 2 wherein one of the sensing devices is adapted to connect to a wall outlet and to monitor current used by a connected appliance.

5. The monitoring system of claim 1 wherein the processor is configured to generate an output image including the power or energy consumed.

6. The monitoring system of claim 5 wherein the processor is further configured to compute the cost of the power or energy used by one or more circuits of which the energy consumption data are collected and to generate an output image including the cost of the power or energy consumed.

7. The home energy monitoring system of claim 5 wherein the processor is configured to group two or more circuits of which the energy consumption data are collected into a circuit group, to compute an aggregate power or energy used by the circuit group, and to create an output image including the aggregate power or energy used by the circuit group.

8. The home energy monitoring system of claim 7 wherein the processor is configured to compute an aggregate cost of the power or energy used by the circuit group, and to create an output image including the aggregate cost of the power or energy used by the circuit group.

9. The home energy monitoring system of claim 1 further comprising a configuration tool for configuration of the display templates by a user.

10. An adapter for a monitoring system including a host device with a display, the adapter comprising:
a housing;
a wireless transceiver disposed within the housing to receive energy consumption data from one or more sensing devices;
memory within the housing to store the energy consumption data and one or more display templates, said memory comprising shared memory accessible by said host device;
a processor within the housing and configured to:
   create one or more output images based on the energy consumption data and the display template; and
   share the output images with the host device using a file-based communication scheme by storing the output images in the shared memory for retrieval by the host device; and
an interface including a physical connector to the host device and an interface circuit to provide the host device with access to the output images stored in the shared memory.

11. The adapter of claim 10 wherein the memory further comprises hidden memory for storing the energy consumption data, said hidden memory being inaccessible to said host device.

12. The adapter of claim 10 wherein the processor is configured to generate an image including the amount of power or energy consumed.

13. The adapter of claim 12 wherein the processor is further configured to compute the cost of the power or energy used by one or more circuits of which the energy consumption data are collected and to generate an image including the cost of the power or energy consumed.

14. The adapter of claim 12 wherein the processor is further configured to group two or more circuits of which the energy consumption data are collected into a circuit group, to compute an aggregate power or energy used by the circuit group, and to create an image including the aggregate power or energy used by the circuit group.

15. The adapter of claim 14 wherein the processor is further configured to compute an aggregate cost of the power or energy used by the circuit group, and to create an image including the aggregate cost of the power used by the circuit group.

16. The adapter of claim 10 further comprising a configuration tool for configuring the display templates by a user.

\* \* \* \* \*